United States Patent

Buck et al.

[15] 3,647,956
[45] Mar. 7, 1972

[54] LASER BEAM FLYING SPOT SCANNER

[72] Inventors: Willard E. Buck, Lake Havasu City, Ariz.; Thomas E. Holland, Sunnyvale, Calif.

[73] Assignee: Technical Operations, Incorporated, Burlington, Mass.

[22] Filed: Mar. 10, 1969

[21] Appl. No.: 805,754

[52] U.S. Cl. ..........................178/7.6, 178/DIG. 27, 350/7, 350/285
[51] Int. Cl. ........................................H04n 1/04, H04n 3/08
[58] Field of Search...................178/DIG. 27, 17.6; 380/6, 7, 380/285

[56] References Cited

UNITED STATES PATENTS

| | | | |
|---|---|---|---|
| 1,999,867 | 4/1935 | Cawley | 178/7.1 E |
| 2,157,468 | 5/1939 | Walton | 178/7.6 |
| 2,758,502 | 8/1956 | Scott | 178/7.6 |
| 3,463,882 | 8/1969 | Herbold | 178/7.6 |

OTHER PUBLICATIONS

Houghton– Scanner for Light Beam– IBM Tech. Disclosure Bulletin– Vol. 10 02 July 1967

Primary Examiner—Robert L. Griffin
Assistant Examiner—Joseph A. Orsino, Jr.
Attorney—Rosen & Steinhilper

[57] ABSTRACT

This disclosure depicts laser beam flying spot flat field raster scanning systems employing orthogonally moved corner mirror trains to produce two dimensional spot motion. Imaging and relaying systems for use with such corner mirror trains are stressed.

11 Claims, 3 Drawing Figures

Willard E. Buck and
Thomas E. Holland
Inventors
By Rosen & Steinhilper
and
John H. Coult

# 3,647,956

LASER BEAM FLYING SPOT SCANNER

BACKGROUND OF THE INVENTION

This application concerns laser beam flying spot scanning systems utilizing, in preferred embodiments, a pair of orthogonally rotated multifaceted mirror wheels to produce a raster scan. Each of the mirror wheels embodies a novel spot-scanning concept involving the use of corner mirrors mounted on the periphery of the mirror wheel. The broad concept of utilizing corner mirrors in a laser beam flying spot scanner is described and claimed in U.S. Pat. No. 3,488,102, Buck et al. assigned to the assignee of the present invention. A brief treatment of the nature and operation of a corner mirror flying spot scanner will be given below as an introduction to a description of the preferred embodiments of this invention.

One of the primary advantages of a corner mirror flying spot scanner is its capability of producing a flat field scan - conventional polygonal mirror wheel scanners produce an arcuate scan and thus are useful primarily in applications where curved reading or recording surfaces are used; for flat field scanning the radius of the arc traced by the flying spot must be sufficiently large in comparison to the scanned field that the amount of image degradation due to the curved field is tolerable.

A corner mirror scanner operates on the principle that if a light beam focus (i.e., a spot) is formed on or contiguous to the locus of travel of a corner mirror, an image of the spot will be formed by the corner mirror which moves with the same motion and in the same direction as the corner mirror, but at twice the velocity thereof. A lens may be used to reimage this flying spot image to form a "line." It has proven to be difficult, however, to extend these principles to form a raster. More specifically, the difficulty arises when it is attempted to form an image of this line upon a second, orthogonally moved corner mirror and then retrieve the raster formed by the second corner mirror without losing flatness of field. If a second lens for imaging the line onto the second corner mirror wheel is located off the principal axis so as to clear the spot-forming lens, the line image formed on the second corner mirror wheel, and thus the raster produced thereby, will be skewed.

OBJECTS OF THE INVENTION

It is an object of this invention to provide a flying spot raster scanning system capable of producing a substantially flat scanned field.

It is another object of this invention to provide, as a part of a flat field flying spot raster scanning system which utilizes orthogonally rotated corner mirror wheels to produce a two-dimensional spot motion, novel imaging and relaying systems for conducting a laser beam to, between, and from the corner mirror wheels in such a way as to optimize the quality of the scanned field in terms of flatness and other desired characteristics.

It is another object of this invention to provide a laser beam flying spot raster scanning system which is nondispersive.

It is still another object of this invention to provide imaging and relay optics for a laser beam flying spot scanning system which promotes compactness and simplicity in the system.

Further objects and advantages of the invention will in part be obvious and will in part become apparent as the following description proceeds.

The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

Figure 1:
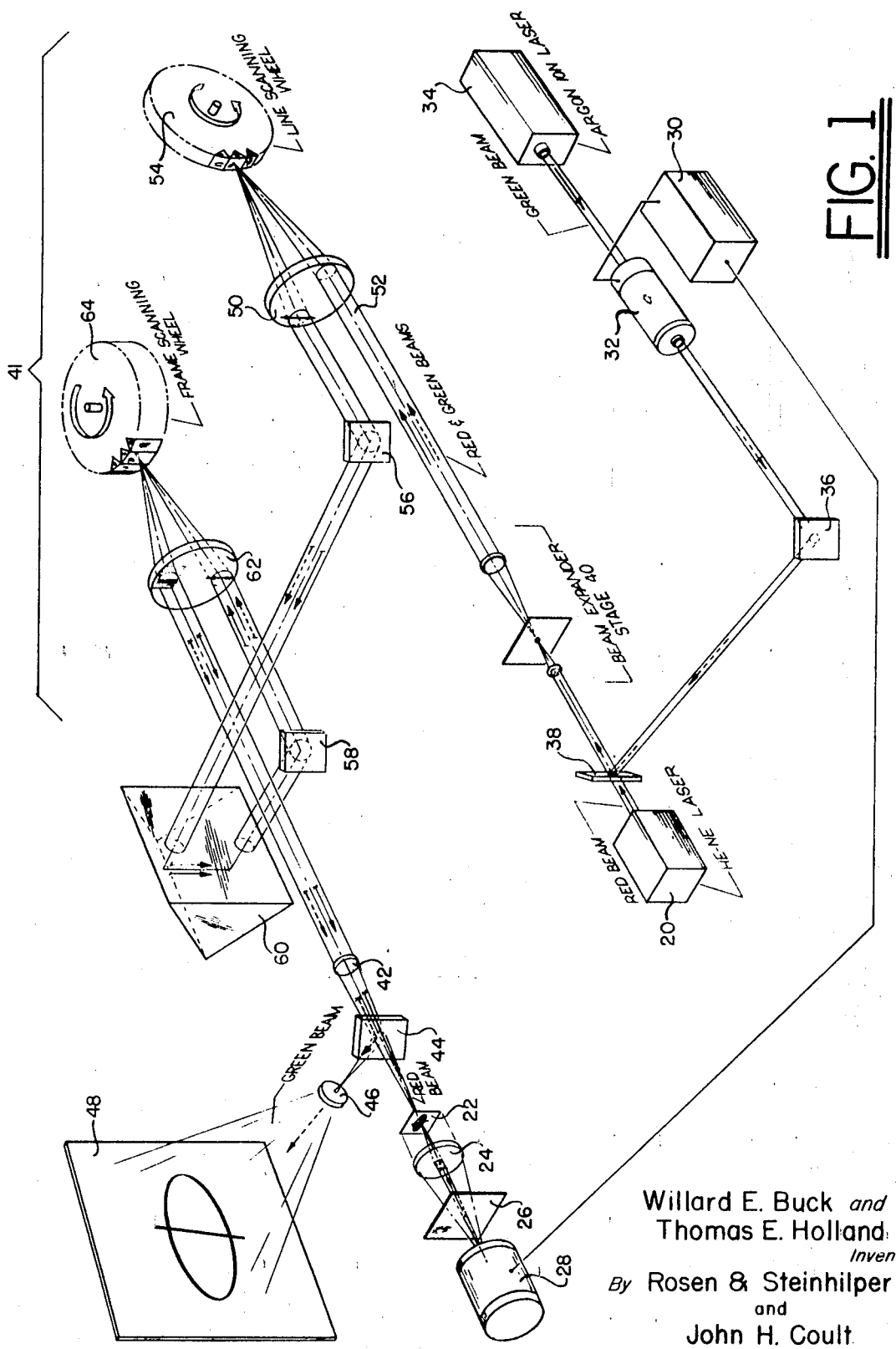
FIG. 1 is a schematic illustration of a laser beam flying spot raster scanning system embodying the principles of this invention.
Figure 2:
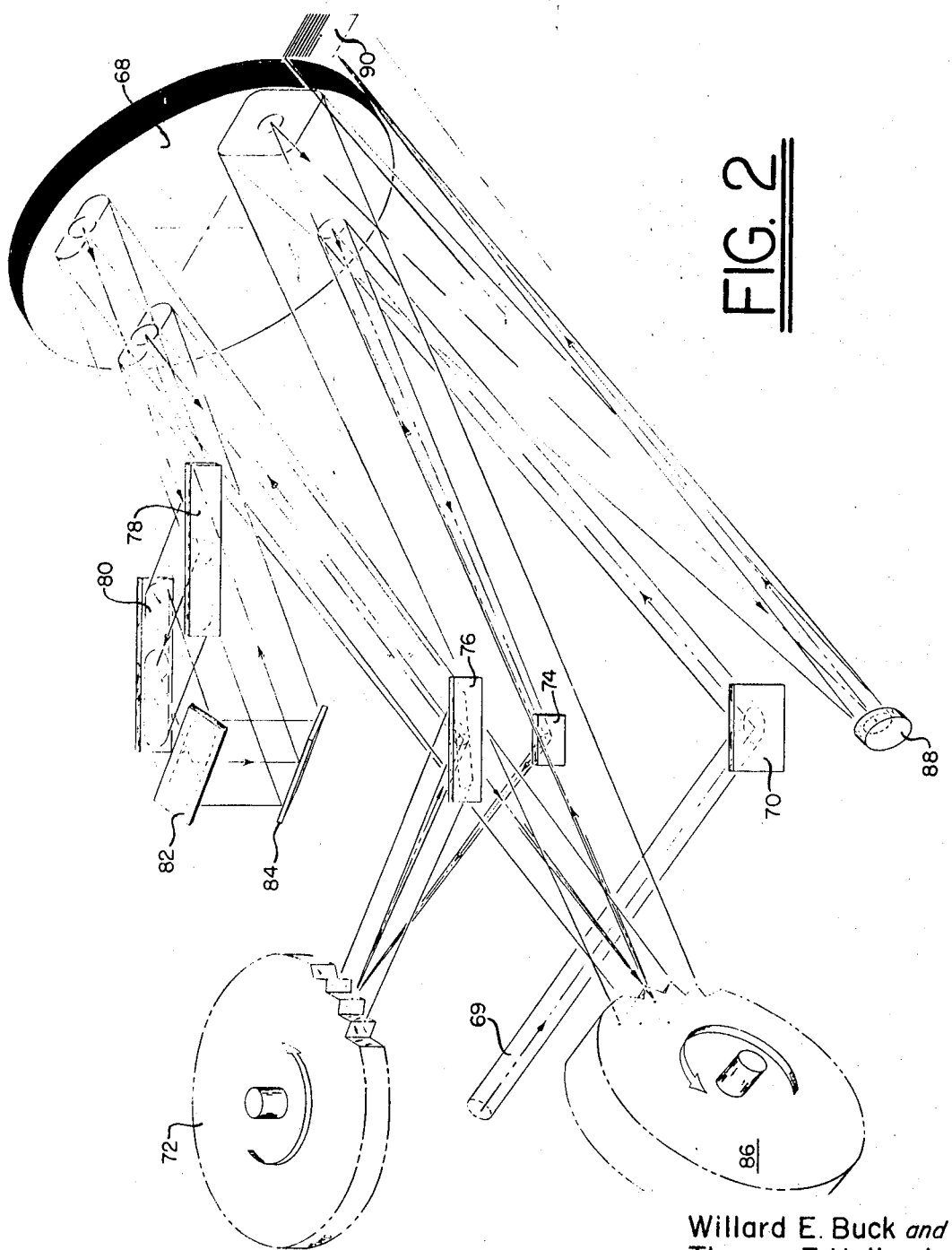
FIG. 2 is a schematic view in perspective of a raster scanning system illustrating a novel all-reflective imaging and relaying optical system designed for use with a pair of orthogonally rotated corner mirror scanner wheels.

FIGS. 1 and 2 illustrate preferred embodiments of the invention. Before undertaking a detailed description of these embodiments, in order to promote a fuller understanding of the invention, a brief description of the nature and operation of a corner mirror scanner will be engaged.

Figure 3:
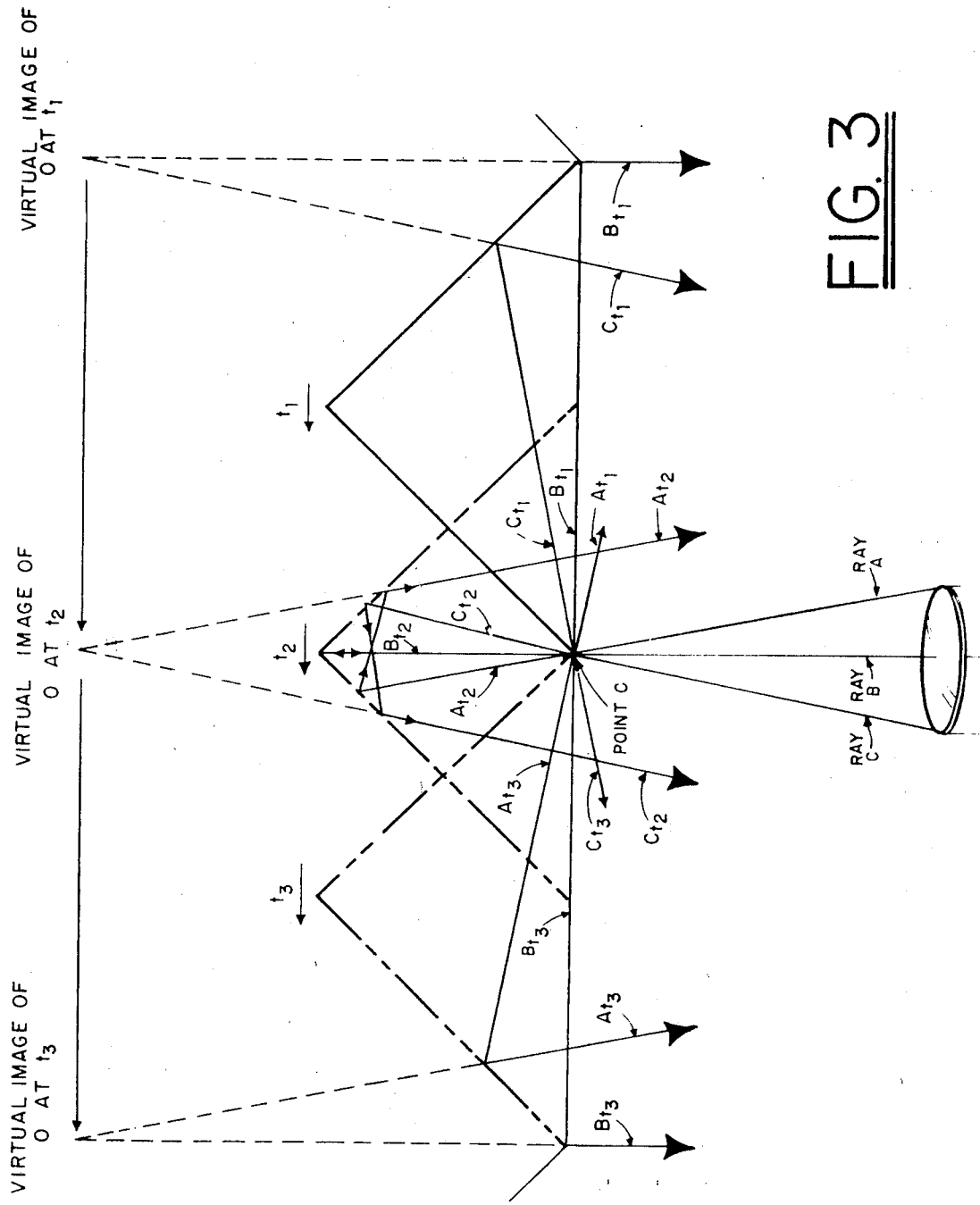
FIG. 3 is a schematic diagram illustrating the principles underlying the operation of a corner mirror flying spot scanner.

FIG. 3 illustrates the corner mirror spot scanning principle. In FIG. 3 a corner mirror train is shown at three different time intervals in a simulated traverse across a stationary input beam converged to a focus in the locus of travel of the corner mirror. At time $T_1$ rays A, B, and C are deflected to the right by the first encountered mirror face. Rays B and C are deflected again by the second mirror face, exiting from the mirror pair parallel to their respective directions of incidence. As shown by the dashed-line extensions of exiting rays B and C, these rays appear to emanate from a virtual image of the beam focus formed behind the corner mirror. If the beam focus were originally formed behind the corner mirror train, rays B and C would emanate from a real beam focus image formed in front of the beam focus.

At time $t_2$ the corner mirror position is shown centered about the input beam. Exiting rays A, B, and C are again traced with dashed-lines to a convergence point representing a virtual image of the beam focus formed at point O.

Similarly, when the corner mirror is in the position shown at time $t_3$, input rays A, B, and C are deflected to the left and after reflection from the second mirror face, appearing to emanate from a virtual image of the beam focus.

Thus, it is seen that transporting a corner mirror through a beam focus results in the formation of a virtual or real image of the beam focus which has a locus of travel corresponding to the locus of travel of the corner mirror train. We have assumed that the mirrors have been moved in a straight line; hence, the locus of the image of the beam focus is also rectilinear. If the corner mirror trains are formed on the periphery of a rotatable wheel, as it is in the preferred embodiments illustrated in FIGS. 1 and 2, the locus of the beam focus image is an arc having a beam generated, for example, by an argon-ion laser 34.. The green beam, which will the wheel radius multiplied by a factor of two.

It is important to note that a doubling effect has occurred, since motion of the mirror through one mirror length has caused the beam focus image to move a distance equal to twice the mirror length. A lens collecting light from the moving beam focus image will produce an angularly sweeping beam whose field scan angle is a function of the limits of movement of the beam focus image.

FIG. 1 illustrates a laser beam flat field flying spot raster scanning system embodying imaging and relaying optics following the principles of this invention. The FIG. 1 system is designed to establish a pair of like rasters which are scanned with inherent synchronization. A red beam generated, for example, by a helium-neon laser 20 is used to interrogate a transparency 22. The modulated interrogating flying spot is received by a relay lens 24, filtered by a red pass filter 26, and detected by a photomultiplier 28. A signal generated in the photomultiplier 28 is fed back to a driver 30 controlling a modulator 32 which modulates a green beam, which will eventually be used to display the information picked up by the interrogating red beam, is introduced onto a common axis with the red beam by a totally reflective mirror 36 and a dichroic beamsplitter 38. Both beams are expanded in a beam expander stage 40 before being fed to a raster scanning system embodying the principles of the invention. The raster scanning system will be described in detail immediately below. At the output of the raster scanning system 41 the beams are substantially collimated and are sweeping together in a two-dimensional angular motion. A lens 42 focus the beams through a dichroic beamsplitter 44 to form a red interrogating raster coincident with the transparency 22 and a green display raster on an axis distinct from the axis of the interrogating raster. A projection lens 46 reimages the green display raster upon a display screen 48.

Because the beams are coincident substantially throughout the system, the interrogating and display rasters are inherently synchronized and are aberration compensated.

The raster scanning system 41 in accordance with this invention comprises a leans 50 performing the dual functions of focusing the input beam 52 to a spot substantially in its back focal plane and then collecting light from the spot after reflection by a line-scanning corner mirror wheel 54 rotated through the back focal plane of lens 50. As described above, the corner mirror wheel 54 causes an image of the spot to move substantially in the back focal plane of the lens 50 in a direction parallel to the direction of motion of the corner mirrors.

It will be noted that the aperture of the lens 50 is effectively divided into a pair of diametrically opposed portions, one of which is used in spot formation and the other of which is used in spot collection. Four reflective surfaces, shown as being constituted by two folding mirrors 56 and 58, and a totally reflective prism 60, serve to introduce the angularly sweeping beam to the raster scanning stage of the system. The raster scanning stage comprises a lens 62 and a corner mirror wheel 64. The wheel 64 is rotated on an axis orthogonal to the axis of corner mirror wheel 54.

The lens 62 performs the dual functions of: (1) focusing the beam to form a line substantially in its back focal plane which contains the locus of travel of the raster-scanning corner mirror wheel 64, and (2) collecting light from the flying spot reflected from the wheel 64. It is evident from the above description that the effect of the raster-scanning corner mirror wheel 64 is to cause the line to be translated in a direction perpendicular to its length such that the flying spot image forms a raster.

As stated, the second function of the lens 62 is to collect light from the raster-defining flying spot which is reflected by the corner mirror wheel 64 to form an output beam 66 performing an angular scan in two dimensions. It will be noted that like lens 50, the effective aperture of the lens 62 is divided into two diametrically opposed portions one of which is employed in the formation of the line on the corner mirror wheel 64, and the other of which is employed in the collection of light from the corner mirror wheel 64.

It is a very important feature of the present invention to provide an optical system in which the laser beam is maintained on or parallel to the system axis at all times throughout the line-forming and raster-forming stages of the scanning system. By utilizing a common imaging element to form the line (or spot) and to collect light from the generated raster (or line), the use of off-axis imaging of the line or raster is obviated. Thus, by this invention, the flat field producing capability of a corner mirror scanner is fully utilized.

In a preferred form of the FIG. 1 raster scanning system, the lenses 50, 62 constitute a symmetric pair of reverse Steinheil doublets for imaging the line produced by corner mirror wheel 54 on the wheel 64. The lens 62 and lens 42 form a second pair of reverse Steinheil doublets. The structure and effect of Steinheil lenses may be obtained from such reference materials as The Handbook of Photography, Kingslake, especially pp. 37–55; and Applied Optics and Optical Design, Conrady, especially pp. 791–801.

The doublets in each pair are spaced two focal lengths apart to form a one-to-one telecentric system. It is well known that a symmetrical pair of doublets, as described, can be readily designed to have low spherical and chromatic aberrations, as well as low coma and astigmatism. By introducing a slight amount of asymmetry in the doublet pairs, the Petzval sum may be brought to zero giving a flat field in addition to the other aberration compensations.

FIG. 2 depicts an extremely compact, all-reflective embodiment of the invention in which all of the necessary imaging and relaying functions performed by lenses 50 and 62 in the FIG. 1 embodiment are accomplished with a single-parabolic mirror 68. The aperture of the mirror 68 is divided into four portions located in quadrants centered on 0°, 90°, 180°, and 270° reference lines. The input beam 69 is introduced parallel to the mirror optical axis with a folding mirror 70. The input beam 69 impinges upon the mirror 68 in the 270° quadrant and is focused by the mirror 69 to a spot in the back focal plane of the mirror 68, which contains the locus of travel of a train of corner mirrors carried by a corner mirror wheel 72. A folding mirror 74 between the parabolic mirror 68 and the mirror wheel 72 enables the line-scanning and raster-scanning mirror wheels to be separated. The corner mirror wheel 72 forms a moving image of the focused spot and reflects the light via folding mirror 76 to the 90° quadrant of the parabolic mirror 68. At this point the parabolic mirror acts to produce a substantially collimated beam sweeping in one dimension. The functions of the parabolic mirror described thus far are analogous to the dual functions performed by the lens 50 in the FIG. 1 embodiment.

The substantially collimated angularly sweeping beam reflected from the 90° quadrant of the parabolic mirror is displaced horizontally and downwardly and returned to the 180° quadrant of the mirror 68 by folding mirrors 78, 80, 82, and 84. The 180° quadrant of the parabolic mirror converges the angularly sweeping beam to form a line in its back focal plane which contains the locus of travel of a train of corner mirrors carried on a raster-scanning corner mirror wheel 86 rotated orthogonally with respect to the line-scanning corner mirror wheel 72. The raster-scanning corner mirror wheel 86 causes an image of the line to translate perpendicular to its length to form a raster.

Light reflected from the mirror wheel 86 is collected in the 0° quadrant of the parabolic mirror 86 to form an output beam sweeping angularly in two dimensions. Reflective imaging means 88 converges the output beam to form an aerial raster at an output plane 90.

The use of a single-parabolic mirror in the FIG. 2 system and a reflective imaging means 88 produces a totally reflective system which is wavelength independent. The use of a single reflector 68 for both the line and raster-scanning stages has the advantages of reducing the number of imaging elements required and of producing an extremely compact system. In practice, line-scanning wheel 72 and the raster-scanning wheel 86 can be driven from the same drive source, the frame-scanning wheel normally being driven through a speed-reducing transmission to cause the frame scan rate to be slower than the line scan rate.

In an alternative embodiment of the invention (not shown) a pair of positive power reflectors replaces reflector 68. Each reflector has dual spot (or line) forming and line (or raster) collecting functions analogous to the functions of lenses 50 and 62 in FIG. 1. The reflectors would be disposed vis-a-vis with a pair of orthogonally rotated corner mirror wheels located between the reflectors at their respective focal points. Folding mirrors would preferably be used to introduce the input beam and retrieve the output beam parallel to the system axis.

Yet another embodiment of the invention (not shown) may be regarded as a glass likeness to the FIG. 2 embodiment. In this embodiment, the input laser beam is introduced parallel to the system optical axis so as to enter one quadrant of the aperture of a four function lens parallel to the lens axis. Two orthogonally rotated corner mirror wheels located effectively in the back focal plane of the lens, and a set of folding mirrors similar in structure and function to mirrors 78, 80, 82, and 84 in FIG. 2 would be used to produce a two-dimensionally sweeping output beam.

In each of the above-described embodiments the apertures of the imaging and relaying optics were described as being divided into quadrants. By this arrangement, interference between the ingoing and outcoming beams is avoided. It is evident that in these embodiments the optics must have an effective aperture at least twice that which would be required if the incoming and outgoing beams were coaxial. In still another embodiment of the invention (not shown) light is sacrificed in favor of a lessening of the aperture requirements. In this embodiment a beamsplitter located on the system axis directs a collimated input beam through a spot (or line) forming and line (or raster) collecting lens. A corner mirror wheel located at the back focal plane of the lens reflects the beam back through the lens on axis to produce a substantially collimated output beam sweeping in one (or two) dimensions. Since the output beam must also pass through the beamsplitter, it is evident that this arrangement results in much greater light loss than in the aforedescribed embodiments. The latter arrangement may be quite useful, however, in situations where aperture considerations override output beam intensity considerations.

The invention is not limited to the particular details of construction of the embodiments depicted and it is contemplated that various and other modifications and applications will occur to those skilled in the art. A further example of such contemplated modifications follows. In each of the above-described embodiments, the spot is formed originally by a dual function lens which also collects light from the line produced by a corner mirror train moving through the back focal plane of the lens. Alternatively, the spot may be formed originally by a separate spot-forming lens located off-axis with respect to the system optical axis. Since a spot has only one dimension, locating the spot-forming lens off-axis with respect to the system optical axis will cause no flatness degradation of the output raster. Certain changes may be made in the above-described apparatus without departing from the true spirit and scope of the invention herein involved, and it is intended that the subject matter of the above depiction shall be interpreted as illustrative and not in a limiting sense.

We claim:

1. An optical scanning system for causing a substantially collimated input laser beam to perform an angular scan comprising:
   optical imaging means on a system optical axis;
   means for directing said input beam to said imaging means on a secondary axis substantially parallel to said system axis but displaced therefrom to form a beam focus at the back focal plane of said imaging means; and
   scanning means comprising:
      mirror means including a pair of reflective surfaces arranged convergent in the direction of propagation of said beam, the line of intersection of said reflective surfaces lying in a plane defined by said system optical axis and said secondary axis, and
      transport means for moving said mirror pair transversely through said beam in the vicinity of said beam focus in a direction orthogonal to said line of intersection of said mirror surfaces to cause an image of said beam focus to move relative to said beam focus, said mirror means reflecting light from said beam focus back to said imaging means on the opposite side of said system optical axis from said input beam to form a substantially collimated angularly sweeping output beam.

2. The system defined by claim 1 wherein said optical imaging means comprises a positive power reflector.

3. The system defined by claim 2 wherein the reflective surface of said positive power reflector is parabolic.

4. An optical scanning system for flying spot recording or displaying a signal in a two-dimensional raster, comprising:
   laser means for generating an input laser beam;
   light modulating means in said input beam for modulating said beam according to a time-varying signal supplied to said modulating means;
   spot-forming imaging means for focusing said input beam to a spot;
   spot-collecting imaging means located substantially a focal length away from said spot for collecting light emanating from said spot;
   line-scanning means located substantially at the focal plane of said spot-collecting imaging means at which said spot is formed, said scanning means receiving radiation from said spot to cause an image of said spot to move substantially in the focal plane of said spot-collecting imaging means, whereby an angularly sweeping beam is produced at the output of said spot-collecting imaging means;
   line-forming imaging means receiving said angularly sweeping beam and forming substantially at the back focal plane thereof a line representing a one-dimensionally moving image of said spot;
   raster-scanning means located substantially at said back focal plane of said line-forming imaging means for causing an image of said line to move in a direction perpendicular to its length to form a two-dimensional raster and for reflecting light back to said line-forming imaging means to produce a substantially collimated output beam making a repetitive two-dimensional scan; and
   imaging means receiving said output beam for forming a two-dimensional raster exhibiting information carried by said signal.

5. The system defined by claim 4 wherein said line and raster scanning means comprise respective trains of corner mirror pairs arranged convergent in the direction of propagation of incident radiation and means for effectively transporting said mirror trains in orthogonal directions.

6. An optical scanning system for flying spot recording or displaying a signal in a two-dimensional raster,
   laser means for generating an input laser beam;
   light modulating means in said input beam for modulating said beam according to a time-varying signal supplied to said modulating means;
   spot-forming imaging means for focusing said input beam to a spot on a system optical axis;
   spot-collecting imaging means located on said optical axis substantially a focal distance away from said spot for collecting light emanating from said spot;
   spot-translating means comprising:
      first mirror means including a first pair of mirror surfaces arranged convergent in the direction of propagation of said beam, and
      transport means for moving said first mirror surface pair transversely through said beam in the vicinity of said spot in a direction orthogonal to the line of intersection of said mirror surfaces to cause an image of said spot to move relative to said spot, said mirror surface pair reflecting light from said spot to said spot-collecting imaging means to form an angularly sweeping beam at the output of said spot-collecting imaging means,
   line-forming imaging means on said optical axis receiving said angularly sweeping beam for forming at the back focal plane thereof a line representing a one-dimensionally moving image of said spot;
   raster-scanning means for causing an image of said line to move perpendicular to the direction thereof to form a two-dimensional raster, comprising:
      second mirror means including a second pair of mirror surfaces arranged convergent in the direction of propagation of said line-forming beam, and
      transport means for moving said second mirror surface pair transversely through said line-forming beam in the vicinity of said line in a direction orthogonal to the line of intersection of said second pair of mirror surfaces and substantially orthogonal to the direction of said line to effectively cause an image of said line to move relative to said line so as to form a raster, said mirror pair reflecting the light defining said raster back to said line-imaging means to form a substantially collimated output beam making a repetitive two-dimensional scan; and imaging means receiving said output beam for forming a two-dimensional raster exhibiting information carried by said signal.

7. The system defined by claim 6 wherein said spot-forming imaging means comprises an objective lens, and wherein said spot-collecting imaging means and said spot-forming imaging means comprise a telecentric set.

8. The system defined by claim 7 wherein said spot-collecting imaging means and said line-forming imaging means comprise a symmetrical arrangement of reverse Steinheil doublets.

9. The system defined by claim 6 wherein said spot-forming imaging means and said spot-collecting imaging means comprise the same structure performing both stated functions, and wherein said system includes means for directing said input light beam to this double-function means on a secondary axis parallel to said system axis but spaced therefrom, said line of intersection of said first mirror pair lying in a plane defined by said system optical axis and said secondary axis diametrically opposed first and second quadrants of said double-function imaging means being employed to form said spot and to collect light from said spot.

10. The apparatus defined by claim 9 wherein said double-function imaging means includes a positive power mirror.

11. The apparatus defined by claim 9 wherein said double-function imaging means and said line-imaging means constitute the same structure, and wherein said system includes means for reflecting said light returned from said second quadrant of said double-function spot-imaging and spot-collecting means and reflecting it back to a third quadrant of said structure, said raster scanning means being located contiguous to said system axis effectively adjacent said line-scanning means for receiving said beam from said third quadrant of said structure and reflecting it back to a fourth quadrant of said structure.

* * * * *